Nov. 25, 1941.     C. L. HARTSELL     2,263,845
PLASTIC DISPENSING COMBINATION
Filed May 8, 1939
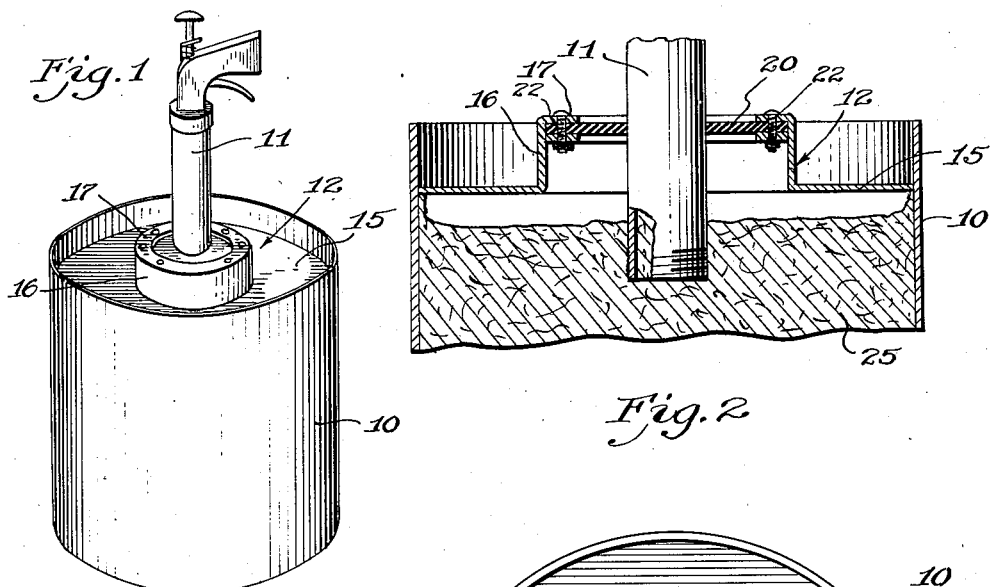
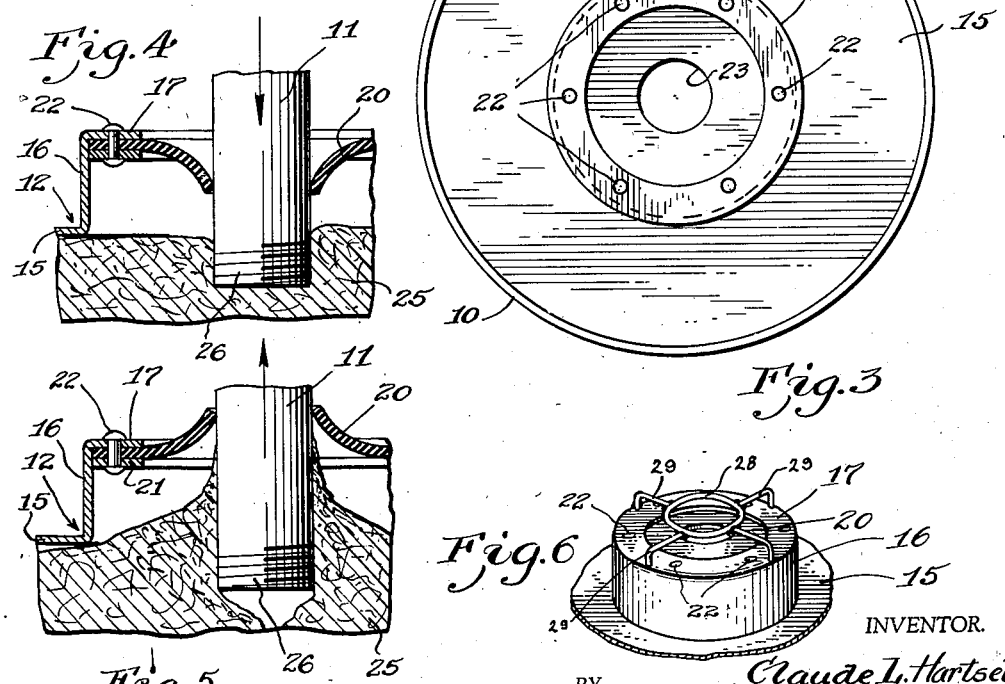
INVENTOR.
Claude L. Hartsell
BY Barnes, Kisselle, Laughlin & Raisch
ATTORNEYS Patented Nov. 25, 1941

2,263,845

UNITED STATES PATENT OFFICE 2,263,845

PLASTIC DISPENSING COMBINATION

Claude L. Hartsell, Detroit, Mich.

Application May 8, 1939, Serial No. 272,426

7 Claims. (Cl. 221—47.5)

This invention relates generally to dispensers and, more particularly, to a dispenser which is adaptable to the dispensing of plastic materials.

In the distribution of such materials as heavy greases or caulking material or other plastics of a similar nature, a gun is often used to facilitate the transfer of the plastic material from a large container to the point at which it is to be used. The type of dispensing gun which is common in this work has an open end barrel with a plunger in the barrel to aid in filling the same and to force the plastic material from the barrel as it is used. The barrel of these guns usually has a diameter from one to two and one-half inches and the end of the gun is usually provided with some sort of a nozzle to reduce the diameter of plastic material which is extruded from the gun. This type of gun is commonly filled by projecting the open end of the barrel with the nozzle removed, into a body of plastic material, and forcing the gun into the material while the plunger is withdrawn. In this way, the barrel is filled partly by suction and partly by force depending on the consistency of the plastic material being used. Since these guns have to be filled quite frequently, especially on caulking jobs, there is considerable inconvenience in wiping off the outside surface of the gun after it has been charged. If the plastic material is very viscous, it is a time consuming task to clean the gun before putting the nozzle on and before putting it in operation.

One inventor has attempted to meet this problem by providing wrapped cartridges of plastic material which may be dropped into the gun after the nozzle is removed. Other attempts have been made to keep the gun clean as it is being loaded. In some cases a guard has been provided to cover the gun barrel as it is thrust into the plastic material. Another device has consisted of a flat apertured plate which is placed on the top of the plastic material. The open end of the gun is then placed over the aperture and the plate forced down. All of these previous methods have proved unsatisfactory either because of additional expense or because of unworkability.

An object of the present invention is to provide a means to be used in combination with the loading of a plastic dispensing gun which permits rapid and normal loading of the gun and which also results in a clean gun which may be applied directly to the work without additional cleaning operations.

An additional object has to do with a cover to be used in combination with a container of plastic material, said cover containing the gun cleaning device and also serving to protect the top surface of the plastic material from becoming dirty or from skimming over.

Other objects and features of the invention have to do with details of construction, as for example, the mounting of the cleaning member, and will be brought out in the following description and claims.

An illustrative embodiment of the invention is shown in the following drawing:

Fig. 1 illustrates generally the combination of a container for the plastic, a caulking gun and a cleaning device.

Fig. 2 is a vertical section of the top portion of a plastic container illustrating details of construction.

Fig. 3 is a plan view of a plastic container showing the nozzle cleaning means.

Fig. 4 is a partial section illustrating the manner in which the gun is inserted to the plastic material.

Fig. 5 is a partial section similar to Fig. 4 showing the manner in which the outside of the gun barrel is cleaned as it is withdrawn from the container.

Fig. 6 is a perspective view of a slightly modified form of the invention.

Referring to the drawing, a plastic container is indicated by reference character 10, a gun is shown at 11 and the cleaning plate, with which the present invention is concerned, is illustrated generally at 12.

The cleaning plate 12 consists generally of a round flat plate 15 having a central cylindrical offset portion 16 standing at right angles to the plate. The plate 15 and the cylindrical offset 16 are preferably formed as a stamping from heavy sheet metal. The offset portion 16 has an inwardly extending flange 17. The plate 15 is dimensioned so that it fits within the container 10 and may slide down within the container to keep the side walls clean.

Supported directly beneath the flange 17 is a flexible disc 20 which has its outer margins fastened to the disc by a retaining ring 21 and rivets 22 (Fig. 4). Removable bolts (Fig. 2) may be substituted for the rivets in case it is thought desirable to provide for replacements of the disc 20. The disc 20 is preferably formed of a heavy rubber, the thickness of which will depend on the consistency of the plastic which is to be used. The disc is provided with a central aperture 23. The diameter of the aperture 23 is preferably slightly less than the outside diameter of the gun barrel 11.

In the use of the cleaning device, the plate 12 is placed on top of a body of plastic material indicated at 25. The gun barrel 11 may then be inserted through the aperture 23 into the plastic material. As shown in Fig. 4, the aperture 23 will be stretched slightly and the flexible disc 20 will be pulled downwardly as the gun enters the plastic body. When the gun has been inserted to the proper depth, it may then be withdrawn and during this withdrawing operation, the disc 20 will assume a position similar to that shown in Fig. 5. In this position, the margins of the aperture 23 are drawn upwardly and the plastic material 25 is scraped from the outside of the barrel as the gun is withdrawn. It is preferable that the gun be withdrawn in a twisting motion since this will more effectively clean the threaded portion 26 at the end of the gun. After the gun is withdrawn, the outer surface will be clean and the proper nozzle may be directly applied and the gun put in use.

In Fig. 6 is shown a modified embodiment of the invention. This embodiment is particularly designed to be used with relatively stiff plastics. It is the same as the device previously described except that a ring 28 is supported by the flange 17 on outwardly extending prongs 29. The ring 28 has a diameter slightly larger than the aperture 23 and the disc 20 is the same flexible disc as before. In this embodiment the gun is inserted as described and upon withdrawal the margins of the aperture 23 in the disc 20 will receive support against outward movement because of ring 28. The margins of the disc 20 will thus be sufficiently stiffened that the plastic will be completely removed from the gun barrel.

The offset portion 16 is provided to keep the member 20 spaced from the plastic so that it may flex downwardly, as described in connection with Fig. 4, during the insertion of the gun and to provide room for the cleaning function as illustrated in Fig. 5.

What I claim is:

1. Means for cleaning the outer surface of a dispensing gun as it is being withdrawn from a mass of plastic material comprising an apertured flexible disc adapted to receive the barrel of the gun as it is being projected into a plastic material, and supporting means for said disc comprising a metal plate arranged to rest on said plastic material, and an offset portion on said plate, said offset portion being apertured, and means for fastening the margins of said disc at the margins of the aperture in said offset portion, said disc being adapted to wipe clean said barrel as it is withdrawn through the aperture therein.

2. For use with a dispensing gun comprising a barrel to be loaded through an open end by projecting the barrel into a mass of plastic material, a means for cleaning the outer surface of the dispensing gun as it is being withdrawn from said plastic material comprising an apertured means adapted to receive said barrel, and supporting means for said apertured means, said apertured means having an elastic inner margin adapted to wipe clean said barrel as it is withdrawn through the aperture in said apertured means.

3. For use with a dispensing gun comprising a barrel to be loaded through an open end by projecting the barrel into a mass of plastic material, a means for cleaning the outer surface of the gun before putting it to use, said means comprising an apertured member to receive said barrel, the margins of said aperture being formed of a soft, flexible material adapted to wipe clean said barrel as it is moved through the member.

4. Means for cleaning the outer surface of a caulking gun as it is being withdrawn from a mass of caulking material comprising a plate adapted to rest on the surface of said material and a flexible portion in said plate apertured to receive the barrel of the gun as it is projected into said material, and means for reinforcing the margins of the aperture in said flexible portion against movement in one direction only whereby said barrel will be wiped clean as it is withdrawn from said aperture.

5. Means for cleaning the outer surface of a caulking gun as it is being withdrawn from a mass of caulking material comprising a plate adapted to rest on the surface of said material and a flexible portion in said plate apertured to receive the barrel of the gun as it is projected into said material, and a ring supported on said plate for reinforcing the margins of the aperture in said flexible portion against movement in one direction only whereby said barrel will be wiped clean as it is withdrawn from said aperture.

6. Means for cleaning the outer surface of a dispensing gun as it is being withdrawn from a mass of plastic material comprising an apertured flexible disc adapted to receive the barrel of the gun as it is being projected into a plastic material, and supporting means for said disc comprising a metal plate, an open cylindrical offset portion extending from said plate, and means for fastening the margins of said disc at the outer end of said cylindrical offset portion, said disc being adapted to wipe clean said barrel as it is withdrawn through said aperture therein.

7. Means for cleaning the outer surface of a dispensing gun as it is being withdrawn from a mass of plastic material comprising an apertured flexible disc adapted to receive the barrel of the gun as it is being projected into a plastic material, and supporting means for said disc comprising a metal plate, an open cylindrical offset portion extending from said plate, and means for fastening the margins of said disc at the outer end of said cylindrical offset portion, and means comprising a ring having outwardly extending prongs supported on said offset portion, said ring being positioned coaxial with and spaced from the aperture in said disc to reinforce the margins of said aperture against movement in one direction whereby said barrel will be wiped clean as it is withdrawn from said aperture.

CLAUDE L. HARTSELL.